United States Patent [19]
Brandwajn et al.

[11] Patent Number: 5,629,862
[45] Date of Patent: May 13, 1997

[54] RULE-BASED PROCEDURE FOR AUTOMATIC SELECTION OF CONTINGENCIES IN EVALUATION OF DYNAMIC SECURITY OF A POWER DISTRIBUTION SYSTEM

[75] Inventors: Vladimir Brandwajn, San Jose; Ali Ipakchi, San Carlos; A. B. Ranjit Kumar, Cupertino; Gerald W. Cauley, San Jose, all of Calif.

[73] Assignee: Electric Power Research Institute, Palo Alto, Calif.

[21] Appl. No.: 297,988

[22] Filed: Aug. 30, 1994

[51] Int. Cl.$^6$ .................................................. H02J 3/00
[52] U.S. Cl. ...................... 364/492; 364/495; 395/915; 307/20
[58] Field of Search .................................. 364/492, 493, 364/495, 480, 483, 223.7, 274, 274.2, 274.3, 274.5, 276, 923, 923.1, 923.3; 395/907, 915; 307/43, 18, 19, 20, 24, 52; 361/1

[56] References Cited

U.S. PATENT DOCUMENTS 3,833,927  9/1974  Carlson et al. ............... 364/495 X
4,644,479  2/1987  Kemper et al. ............... 364/550

OTHER PUBLICATIONS

Salama et al., "An Expert System for Reactive Power Control of a Distribution System" Transmission and Distribution, 1991 International Conf. pp. 633–638.

Article entitled "An Artificial Intelligence System for Power System Contingency Screening", By Dejan J. Sobajic and Y.H. Pao, IEEE Transactions on Power Systems, vol. 3, No. 2, May 1988.

*Primary Examiner*—Ellis B. Ramirez
*Assistant Examiner*—M. Kemper
*Attorney, Agent, or Firm*—Flehr, Hohbach, Test, Albritton & Herbert

[57] ABSTRACT

Dynamic security analysis of a power system is divided into several diverse sub-problems, including sub-problems that may be analyzed using artificial intelligence ("AI") technology. A rule-based topological analysis procedure distinguishes between outage contingencies that are definitely safe or harmless to the integrity of the power system, and potentially severe outage contingencies that are harmful to the power system. Initial outage selection correctly relates the state of the power system before the analysis. By methodically and automatically identifying potentially severe outages, the need for extensive off-line studies based on time domain simulations is avoided, thus promoting computational efficiency. This methodology further provides automatic detection of critical interfaces, e.g., flows through which may significantly impact the post-contingency state of the power system.

12 Claims, 3 Drawing Sheets

RULE-BASED PROCEDURE FOR AUTOMATIC SELECTION OF CONTINGENCIES IN EVALUATION OF DYNAMIC SECURITY OF A POWER DISTRIBUTION SYSTEM

FIELD OF THE INVENTION

The invention relates to systems for analyzing outage failure modes associated with electrical power distribution systems, and more specifically to analytical techniques for reducing the number of contingencies to be dynamically analyzed in determining the security of such systems following a system outage.

BACKGROUND OF THE INVENTION

Utility companies generate electrical power, often at many hundred thousand volt levels, and distribute the power over a reconfigurable network grid system to various customer loads. Conservative system design requires anticipation of the many contingent modes of failure that may occur in such a system. For example, if a generator fails to output sufficient power, the defective generator must be taken off-line to remove the outage fault condition. Next, the grid is reconfigured so customers formerly supplied electricity from the failed generator can receive power from another generator. Of course many other faults can also contribute to a system failure.

Any of these failure modes, and others as well, may lead to fault conditions that can damage the distribution system, perhaps catastrophically, and/or cause great inconvenience to the customer. In each instance, once the defective system components are identified and taken off-line, a post-fault system equilibrium condition is attained and analyzed. A decision is then made to reconfigure the grid in a given fashion to continue to supply electricity, to the best of available resources.

But once post-fault equilibrium condition is reached, the grid may be reconfigured in a great number of ways, some of which will be more optimum than others. Further, determining the best reconfiguration of the remaining system may have to be accomplished within a matter of minutes. The problem then is how to best determine an optimum system reconfiguration in a finite amount of time.

It is known in the art to employ on-line dynamic security analysis ("DSA") of a power system, the goal being to provide the power system operator with timely information on transfer limits and system stability margins. However, attaining this information requires analysis of hundreds of transient and dynamic stability contingencies approximately every ten minutes using time domain simulations. The large number of contingencies that must be considered is dictated by reliability requirements needed to ensure that all potentially severe, e.g., unstable, contingencies are considered.

Typically, prior art dynamic security analysis techniques assume that predicting system security with respect to a given contingency, requires a knowledge of (a) the post-fault equilibrium condition, (b) severity of the disturbance as given by system state deviation system immediately after fault-clearing from post-fault equilibrium, and (c) system ability to withstand the disturbance as given by the maximum potential energy at the relevant unstable equilibrium point of the post-fault system.

In pre-selecting contingencies for further processing, the prior art relies upon experience from previous studies including past experience from actual faults in the power system, and judgment of the engineers operating the power system. As such, pre-selection is based upon an expected or desired state of the power system. However, such desired state may be unrelated to the actual state of the system for which new studies are to be conducted.

To reduce the insecurity inherent in not knowing whether the desired state and the actual system state are the same, an unnecessarily large set of potential outages is created that is assumed valid for a wide range of operating conditions. Further, separate lists of outages may be created for each specifically-identified pattern of system operations.

Selecting the appropriate contingencies out of potentially hundreds of contingencies is, however, itself an extremely computationally intensive and time consuming process. Further, simulating the more relevant-appearing contingencies is itself a computationally demanding process. It is also recognized that even a small subset of the considered outage contingencies may present dynamic security analysis problems. In short, either too many outages are considered, or there is a risk that an important outage may go unconsidered. This uncertainty is compounded by the fact that there is no assurance that pre-selection will be proper for the actual conditions experienced by the power system.

However they were selected, the more relevant appearing contingencies are then simulated on a computer system using algorithmic procedures to approximate their stability effects upon the power system. Relevant contingencies are those that appear to produce an unsafe and unstable state of the power system following the fault. By contrast, less relevant contingencies appear to result in a safe and stable power system state following the fault.

It is important to appreciate the speed requirements for simulation according to the present invention. Realistically a power system may include a great many power generators and perhaps 2,500 busses. It is important that no potential contingencies be excluded from the analysis, and thus as many as 500 contingencies must be accounted for. The number of contingencies to be considered is also large as there is no prior knowledge about the potential severity of many outages.

Notwithstanding the large number of contingencies to be considered, in practice total simulation should occur in less than an hour, and preferably in about 30 minutes, with perhaps a 20 second stability simulation requirement. But even using state of the art processing equipment, computational time is excessive. For example, evaluating 500 contingencies using a Digital Equipment Corporation ALPHA 150 MIP chip would take about 12 hours.

Simply stated, prior art techniques for on-line dynamic security analysis are simply not feasible because the computation requirements result in a turnaround time of many hours, even using the fastest commercial computer hardware economically practical.

What is needed is a more rapid method for selecting the more relevant contingencies to be analyzed in the event of a power system fault. Such method should avoid time domain analysis, and complete a meaningful analysis of the fault presented within a matter of minutes.

The present invention discloses such a method for winnowing down the set of potential contingencies to be analyzed.

SUMMARY OF THE PRESENT INVENTION

For a monitored power system, on-line dynamic security analysis computation time is reduced by a pre-selection procedure that considers only pre-contingency conditions upon the system. By methodically and automatically identifying potentially severe outages, extensive off-line studies based upon time domain simulations are avoided.

A fast topological analysis of the power system network is performed, and those system elements whose outage may significantly affect power system stability and safety are identified. In addition, analysis according to the present invention permits automatic detection of critical interfaces, e.g., interfaces through which electrical flow can significantly impact the post-contingency state of the power system.

The culling processes is a rule-based procedure that distinguishes between outages that are definitely safe in that their occurrence will not harm the integrity of the power system, and outages that are potentially severe or harmful to the system. This determination is based upon a set of rules and supplementary calculations, and reflects the operating experience of power engineers with a set of auxiliary calculations that automatically identify the weak links in the power system. Following this preselection of outages, a simulation analysis can be initiated.

Other features and advantages of the invention will appear from the following description in which the preferred embodiments have been set forth in detail, in conjunction with the accompanying drawings.

DETAILED DESCRIPTION OF THE PREFERRED EMBODIMENT

Figure 1:
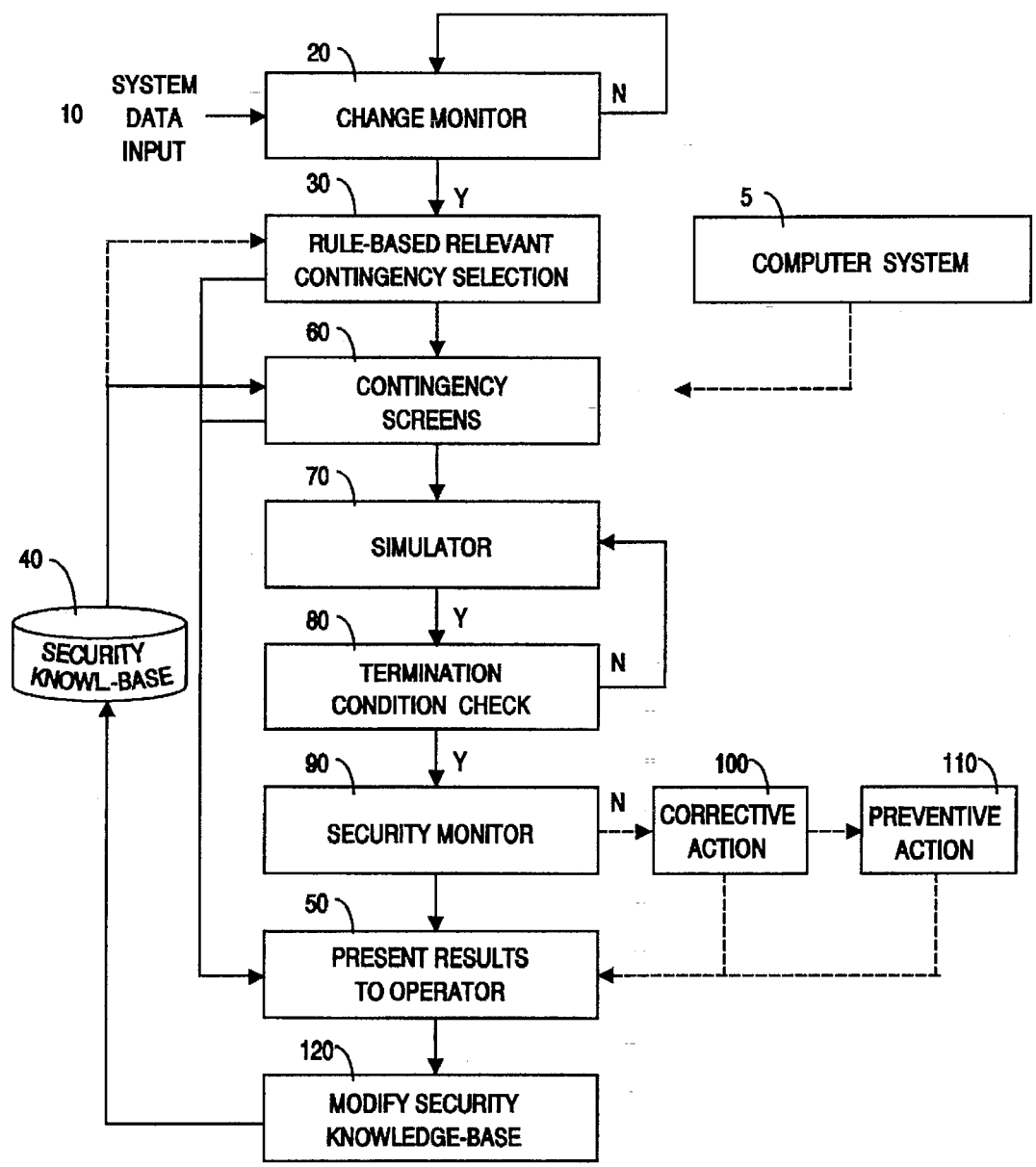
FIG. 1 is a block diagram of an on-line dynamic security analysis system including a rule-based selection procedure, according to the present invention.

In brief overview, the present invention recognizes that the complexity of a power system effectively precludes meaningful dynamic security analysis using a single algorithmic approach. Dynamic security analysis, according to the present invention, is divided into several diverse subproblems, including sub-problems that may be analyzed using artificial intelligence ("AI") technology.

A rule-based topological analysis procedure distinguishes between outage contingencies that are definitely safe or harmless to the integrity of the power system, and potentially severe outage contingencies that are harmful to the power system.

Initial selection of outages correctly relates the state of the power system before the analysis. This is in contrast to prior art techniques wherein selection is based upon some arbitrarily determined study conditions that may not in fact correctly reflect the actual state of the power system. By methodically and automatically identifying potentially severe outages, the need for extensive off-line studies based on time domain simulations is avoided, thus promoting computational efficiency.

Computational efficiency is present in that time domain simulations are not required. Instead, a fast topological analysis of the power system network is performed, wherein elements whose outage may significantly affect the power system are identified. This process further provides automatic detection of critical interfaces, e.g., flows through which may significantly impact the post-contingency state of the power system.

In an attempt to generalize the present invention, applicants analyzed an industry-wide survey of existing engineering expertise in the field of dynamic security analysis. Based upon such studies, applicants arrived at a set of general rules that were non-specific to a particular utility power plant installation. The physical concepts underlying these rules were then identified and additional studies made to define rules embodying the generalized underlying physical concepts.

The types of general rules developed will now be described. With respect to important power lines, applicants developed rules mimicking a human expert who considers various attributes of the transmission lines that may be detrimental to system dynamic security. For each of the associated attributes, threshold values are defined, based upon previous experience. Thus, a line outage is considered important if any of the real or apparent power, reactive power, the ratio of reactive power to real power, or the phase angle across the line are large.

Similarly, the present invention employs rules for important voltage-carrying buses. A fault at a bus is considered important if any of the total power flow towards or away from the bus, the total real or reactive load or generation of the bus are large. A knowledge of the important buses in the power system helps to screen and reduce the number of lines selected for further analysis. Thus, if a bus is not important, outages of lines connected to that bus are not selected for study. If, for example, the power system is secure for the outage of a line carrying the maximum amount of power to or from an important bus, then the system is also secure for outages of other lines carrying power to or from that same bus.

Rules were also developed for important interfaces. Some areas of the power system will be more important than others, and some interfaces (e.g., some groups of lines that represent a vulnerable portion of the system) will be more important than others. Each interface is associated with a "sending" area or end and a "receiving" area or end. An interface is important if the power carried by it is large with respect to the generation in the sending area, to the load in the receiving area, or the inertia in the sending or the receiving area. It may be assumed that if the system is secure with respect to the outage of the line carrying the most power in an interface, then the system is also secure relative to the outage of any single line outage in that interface. For this reason, it suffices to select only the most important line(s) of the interface.

Rule-based procedures according to the present invention may be directed to important lines, important busses and important interfaces. These procedures may be invoked a variety of sequences. For example, the most important interfaces may be first identified. Next, the most important lines in each important interface are identified, and the more important of the two busses associated with each selected line is determined as the significant fault location of interest. In another application, the most important lines might be first identified, and so forth.

The above-described rule-based approach differs from the prior art in several aspects. The initial selection of outages correctly reflects the state of the power system before the analysis. This is in contrast to prior art techniques wherein the power system state reflects an arbitrarily determined study condition that may not correctly reflect the actual system state.

Further, by relying upon a methodical and automatic method of identifying potentially severe outages, the need for extensive off-line studies based on time domain simulations is avoided. This advantageously reduces computational time substantially relative to prior art analysis techniques for selecting severe outages.

In addition, the preferred set of rules combines the operating experience of power engineers with a set of auxiliary calculations that automatically identify weak or vulnerable links in a power system. In extensive tests performed on models of several large scale power systems, the present invention has demonstrated a high level of reliability and high computational efficiency.

FIG. 1 is a block diagram of a preferred implementation of the present invention, which operates under control of a computer system 5, such as a work station. As shown, data 10 is input from a power system (not shown) that is being monitored. This data is input to a change monitor procedure 20 that examines the data to determine whether any changes in system conditions since the previous assessment are significant enough to warrant a new assessment. If not significant, no new assessment occurs.

However, if a significant change in systems is detected, at step 30 contingencies relevant to the current system state are selected for further evaluation using the rule-based procedure described herein. As noted, rule-based contingency selection at step 30 is based on the actual pre-contingency steady-state operating conditions of the power system under examination.

Understandably these conditions can change as a result of forced and scheduled outages, as well as changes in customer demand. Although it is important that no potentially severe credible contingency be excluded or overlooked, it is also true that selecting a set of contingencies without regard to the operating conditions will result in a set that is too large or too small. While selection of a few marginal cases is acceptable, it is understood that the exclusion of a single severely unstable case may be catastrophic. As noted, applicants' rule-based procedures may be directed to important lines, important busses and important interfaces in a variety of sequences. Further, accuracy and performance of the rule-based procedure may be enhanced by suitable tuning. Note from FIG. 1 that the contingency selection may be presented to the system operator at step 50.

At step 60 the contingencies are screened to evaluate whether the present power system state is secure with respect to a given contingency based upon various approximations. The result of step 60 is that an input set of relevant contingencies is screened down to a smaller subset of contingencies that are relevant to a potentially unstable state of the power supply system. Note that a sufficiently non-threatening set of contingencies, in response to the detected fault condition, can branch the procedure to step 50, wherein the present contingency evaluation is displayed to the system operator.

At step 70, simulation begins and a determination is made of the configuration and the transient state of the power system. This determination is made at the end of a simulated time segment, preferably using numerical integration techniques. In the preferred embodiment, simulation 70 was carried out using algorithms as a subroutine for the Extended Midterm Stability Program ("ETMSP V2P"), available through Electrical Power Research Institute, Inc. located in Palo Alto, Calif.

The simulation results are presented to step 80, wherein a termination condition check is made. Step 80 determines whether the power supply system in the presently configured simulation will come to a steady-state. If not, the simulation at step 70 continues. However, if step 80 determines that a steady-state condition will be attained, the procedure continues to step 90.

At step 90, the security of the system is monitored, and an evaluation is made of the acceptability, or security, of the post-fault contingency steady-state. Step 90 preferably includes checking for branch overloads, bus voltage and reactive generation limit violations, in addition to checking the location and amount of lost load/generation. The determination at step 50 preferably is presented to the system operator at step 50.

If, however, step 80 determines that the post-contingency state will not result in an acceptably secure power system, step 100 determines whether timely post-contingency corrective actions are possible, to force the system to an acceptably secure state. However, if appropriate corrective actions are not available, step 110 determines the necessary precontingency preventive action(s), and communicates same to the system operator at step 50.

It is understood that step 50 may be accomplished in many ways, including using a display on a computer terminal, perhaps a workstation monitor, using a system of display warning lights, among other mechanisms including audible warnings.

At step 120, the security knowledge-database 40 is modified to add significant new information about the present contingency, and to add the initial operating conditions to the existing knowledge database. In a future embodiment, as indicated in FIG. 1 by broken lines, a properly augmented security knowledge-base 40 would be able to supply additional information for use by step 30 for further analyses.

Figure 2:
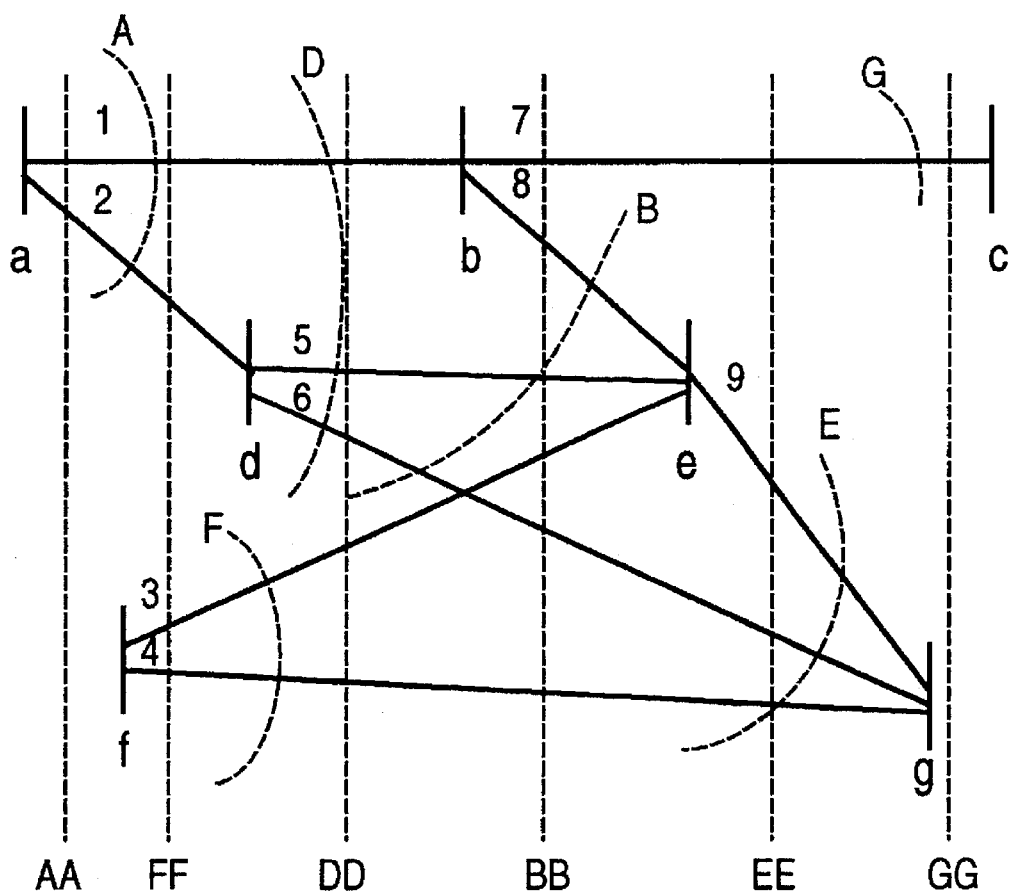
FIG. 2 depicts a generic power system network including nodes, sets, cutsets and minimal cutsets, according to the present invention.

FIG. 2 typifies identification of a relevant cutset or subset for a generic power system network. Network bus nodes in FIG. 2 are depicted by vertically-oriented rectangular lines labelled lowercase "a" through "g". Inter-node connections are represented by arcs, shown as solid lines labelled '1' through '9'. Relevant cutsets, defined by applicants' rule-based procedure, are depicted as broken curves labelled 'A', 'B',and 'D' through 'G'. The horizontal position of each node a, b, ... g, is selected such that power flow in any arc goes from the left to the right.

A cutset is defined as a set of arcs that, when removed from a connected network, separates the network into two or more unconnected parts. A minimal cutset is a cutset wherein a subset of its arcs is not a cutset.

With reference to FIG. 2, the rule-based procedure used to identify relevant cutsets in a power system network is given by the following steps:

First, assign horizontal positions of the nodes such that the power flow in any arc is from the left to the right. In most cases, this can be done by taking the phase angle of the voltage vector of the node as the position.

Construct vertical lines immediately to the right of each bus. In FIG. 2, these lines are drawn in phantom and are labelled AA, BB ... GG. For example, phantom vertical line labelled 'BB' is defined immediately to the right of node 'b'. The set of arcs intersected by line BB consists of arcs denoted 7, 8, 5, 6, 3 and 4.

This set is properly a cutset because deleting its arcs separates the original network into at least two parts, lying to the left and right of line BB.

Thus each vertical line, corresponding to each node except the right most one (node 'c' in the example) gives rise to a cutset.

In the example of FIG. 2, the following cutsets may be identified:

AA containing arcs: 1, 2
BB containing arcs: 7, 8, 5, 6, 3, 4
DD containing arcs: 1, 5, 6, 3, 4
EE containing arcs: 7, 9, 6, 4
FF containing arcs: 1, 2, 3, 4
GG containing arc: 7

However, not all of these cutsets are necessarily minimal cutsets. For example, cutset FF is not a minimal cutset because it contains AA (arcs 1, 2) as a subset. The minimal cutsets can be identified from the above cutsets by comparing each pair of cutsets and checking whether one of the cutsets is a subset of the other. If so, the arcs of the smaller cutset should be deleted from the larger cutset. According to the present invention, this procedure is carried on iteratively until none of the cutsets is a subset of another cutset.

Thus, in the example of FIG. 2, the following minimal cutsets may be identified:

G containing arc: 7 (Same as GG)
A containing arcs: 1, 2 (Same as AA)
F containing arcs: 3,4 (Same as FF less A)
D containing arcs: 1, 5, 6 (Same as DD less F)
B containing arcs: 8,5,6 (Same as BB less F and G)
E containing arcs: 9, 6, 4 (Same as EE less G)

Those skilled in the art will appreciate that various arithmetical and topological set properties may be used to minimize the computational burden associated with this iterative process. Software encompassing the present invention may be stored or loaded into computer system 5 (see FIG. 1), which computer system may then carry out the rule-based procedures described herein.

Figure 3:
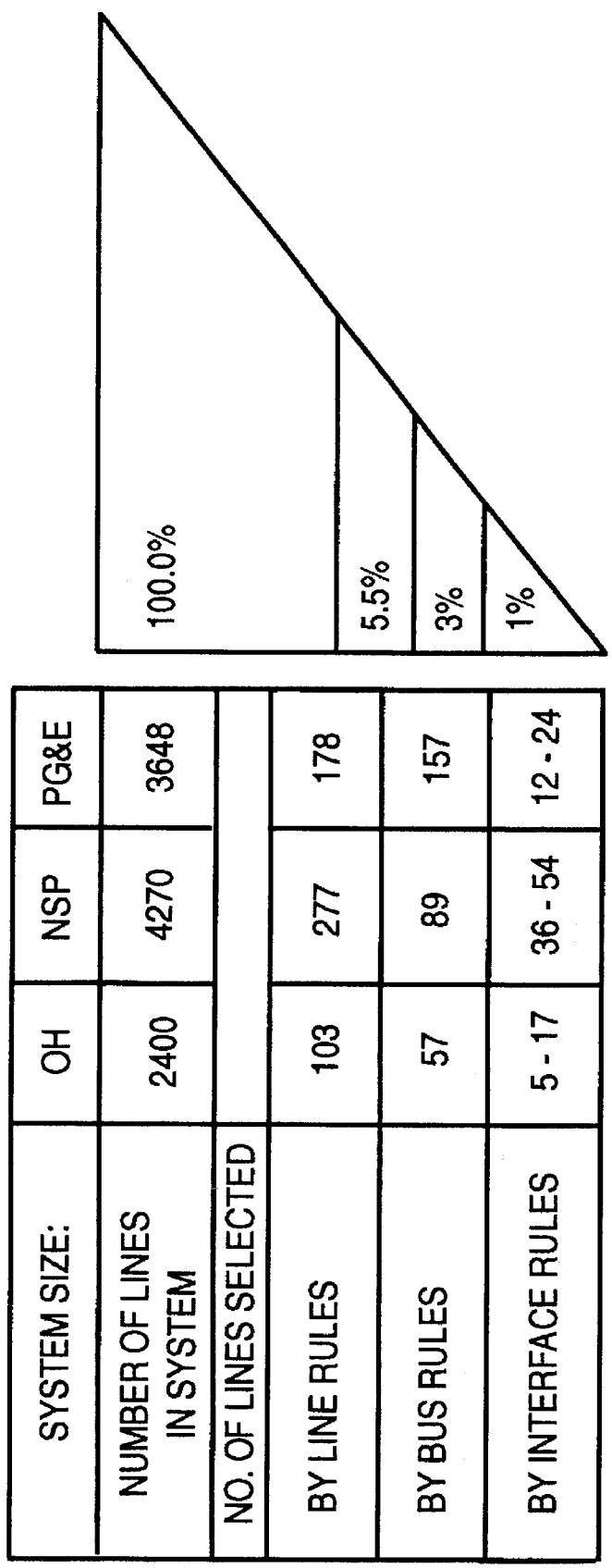
FIG. 3 depicts rule-based contingency selection results for models of three power plants, according to the present invention.

FIG. 3 summarizes the results of rule-based contingency selection according to the present invention. Data were obtained for models of the Canadian Ontario Hydro power plant ("OH"), the Minnesota based Northern States Power plant ("NSP"), and a California based Pacific Gas and Electric Co. power plant ("PG&E"). As shown, each model included several thousand lines.

It will be appreciated from FIG. 3, that use of the present invention pared down considerably the number of lines selected for further analysis, with typically less than about 1% of the lines requiring further consideration The number of selected lines can be varied by tuning selection parameters, for example, by defining as the most important interface only 40% of all interfaces, or perhaps 50% of interfaces. Further, when defining large line flow, the definition of large may be tuned or adjusted.

Modifications and variations may be made to the disclosed embodiments without departing from the subject and spirit of the invention as defined by the following claims.

What is claimed is:

1. A method for selecting fault contingencies to be evaluated in a real-time determination of their effects upon the dynamic security of a power system that includes power generators and power-carrying lines, the method comprising the following steps:

(a) defining a full set of potential contingencies for said power system; and (b) using a computer system to apply a rule set including at least one interface rule to said full set to determine at least one sub-set thereof, said subset identifying contingencies that are potentially unstable to said power system;

wherein said interface rule governs a cut-set defined by the following steps:

(c) representing said power system as a collection of network nodes having inter-node connections represented as interconnecting arcs, wherein said network nodes are spatially identified such that power flow of said power system in any said arc goes from a first direction toward a second direction;

(d) defining a said cut-set as a set of said interconnecting arcs that when removed from a connected said network separates said network into at least two second unconnected parts;

(e) defining from a set of each said cut-set a minimal cut-set, wherein a said minimal cut-set is a cutset such that a subset set of said minimal cut-set arcs is not itself a cutset; and (f) arriving at a minimal cut-set that is not a subset of another cut-set.

2. The method of claim 1, wherein said rule set includes at least one power-carrying line rule identifying as significant a line outage when at least one condition is present selected from the group consisting of (i) real line power exceeds a predetermined threshold for real line power, (ii) apparent line power exceeds a predetermined threshold for apparent line power, (iii) reactive line power exceeds a predetermined threshold for reactive line power, (iv) a ratio of reactive line power to real line power exceeds a predetermined threshold for reactive-to-real line power ratio, and (v) phase angle across a line exceeds a predetermined threshold for phase angle.

3. The method of claim 2, wherein at least one said threshold is predetermined by a human expert.

4. The method of claim 1, wherein said rule set includes at least one power-carrying bus rule identifying as significant a bus outage when at least one condition is present selected from the group consisting of (i) total power flow toward a bus exceeds a predetermined threshold for total power flow, (ii) total power flow away from a bus exceeds a predetermined threshold for total power flow, (iii) total real bus load exceeds a predetermined bus total real load threshold, (iv) total reactive bus load exceeds a predetermined bus total reactive load threshold, (v) total real generation of the bus exceeds a predetermined threshold for total real bus generation, and (vi) total reactive generation of the bus exceeds a predetermined threshold for total reactive bus generation.

5. The method of claim 4, wherein at least one said threshold is predetermined by a human expert.

6. The method of claim 1, wherein said at least one interface rule identifies as significant an outage in said interface.

7. The method of claim 6, wherein said at least one interface rule identifies as significant an outage in said interface when at least one condition is present selected from the group consisting of (i) a relative ratio between power to an interface and power generation in a sending area of said interface, (ii) a relative ratio between power to an interface and load in a receiving area of said interface, (iii) a relative ratio of power to an interface and inertia in a sending area of said interface, and (iv) a relative ratio of power to an interface and inertia in a receiving area of said interface.

8. The method of claim 7, wherein at least one said ratio is predetermined by a human expert.

9. The method of claim 1, wherein only contingencies identified in said at least one sub-set at step (b) are subjected to further evaluation to determine their effects upon said power system.

10. The method of claim 1, wherein said at least one interface rule identifies as significant an outage in said interface based upon at least one condition selected from the group consisting of (i) a relative ratio between power to an interface and power generation in a sending area of said interface, (ii) a relative ratio between power to an interface and load in a receiving area of said interface, (iii) a relative ratio of power to an interface and inertia in a sending area of said interface, and (iv) a relative ratio of power to an interface and inertia in a receiving area of said interface.

11. The method of claim 1, wherein a said minimal cut-set is iteratively determined.

12. The method of claim 1, wherein step (f) includes repeating steps (c), (d), and (e) iteratively until no remaining cut-set is a subset of another cut-set.

* * * * *